(12) United States Patent
Ozmen et al.

(10) Patent No.: US 10,583,412 B1
(45) Date of Patent: Mar. 10, 2020

(54) APPARATUS FOR CATALYTIC REFORMING HYDROCARBONS HAVING FLOW DISTRIBUTOR AND PROCESS FOR REFORMING HYDROCARBONS

(71) Applicant: UOP LLC, Des Plaines, IL (US)

(72) Inventors: Jennifer Ozmen, Wilmette, IL (US); Hadjira Iddir, Hoffman Estates, IL (US); Jeffrey Grott, Chicago, IL (US); Michael J. Vetter, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/551,496

(22) Filed: Aug. 26, 2019

(51) Int. Cl.
 *B01J 8/00* (2006.01)
 *B01J 8/02* (2006.01)
 *B01J 8/04* (2006.01)
 *C10G 35/04* (2006.01)

(52) U.S. Cl.
 CPC ............ *B01J 8/0278* (2013.01); *B01J 8/003* (2013.01); *B01J 8/008* (2013.01); *B01J 8/0214* (2013.01); *C10G 35/04* (2013.01); *B01J 2208/00893* (2013.01); *B01J 2208/00938* (2013.01)

(58) Field of Classification Search
 CPC ... B01J 8/00; B01J 8/0015; B01J 8/003; B01J 8/008; B01J 8/02–0214; B01J 8/0278; B01J 2208/00796; B01J 2208/00893; B01J 2208/00938; C10G 35/00; C10G 35/04
 See application file for complete search history.

(56) References Cited

U.S. PATENT DOCUMENTS

| | | |
|---|---|---|
| 2,766,186 A | 10/1956 | Nadro, Jr. |
| 3,223,616 A | 12/1965 | Huntington |
| 3,706,536 A | 12/1972 | Greenwood et al. |
| 4,167,473 A | 9/1979 | Sikonia |
| 4,567,023 A | 1/1986 | Greenwood et al. |
| 5,366,704 A | 11/1994 | Koves et al. |
| 5,580,241 A | 12/1996 | Koeberle et al. |
| 5,683,573 A | 11/1997 | Haizmann et al. |
| 6,224,838 B1 | 5/2001 | Schulz et al. |
| 6,657,096 B2 | 12/2003 | Boehner et al. |
| 7,531,142 B2 | 5/2009 | Huziwara et al. |
| 7,842,257 B2 | 11/2010 | Fecteau |
| 8,691,155 B2 | 4/2014 | Palmas et al. |

(Continued)

FOREIGN PATENT DOCUMENTS

| | | |
|---|---|---|
| CN | 103073377 A | 5/2013 |
| JP | 11108561 A | 4/1999 |
| RU | 2180346 C2 | 3/2002 |

OTHER PUBLICATIONS

International Preliminary Report on Patentability from PCT application No. PCT/US2017/041722, dated Jan. 29, 2019.

(Continued)

*Primary Examiner* — Natasha E Young (57) ABSTRACT

A reforming reactor and process of using same in which the process gas is effectively and efficiently distributed through the non-reactive zone. The non-reactive zone has two portions, a first portion receiving a purge gas and having an outlet for an effluent from a reactive zone disposed beneath the non-reactive zone and a second portion receiving the feed and having an inlet. The inlet is located between the reaction zone and the outlet. A flow distributor separates the non-reactive zone into the two portions.

20 Claims, 5 Drawing Sheets

(56) References Cited

U.S. PATENT DOCUMENTS

| | | | |
|---|---|---|---|
| 8,894,940 B2 | 11/2014 | Krishnamurthy et al. | |
| 9,683,179 B2 * | 6/2017 | Holmgreen | C10G 35/04 |
| 2010/0160148 A1 | 6/2010 | Nabozny | |
| 2012/0275974 A1 | 11/2012 | Moser et al. | |
| 2014/0205506 A1 | 7/2014 | Whiffenberger et al. | |
| 2014/0294682 A1 | 10/2014 | Vetter et al. | |
| 2015/0057480 A1 | 2/2015 | Jeffrey et al. | |

OTHER PUBLICATIONS

Written Opinion from PCT application No. PCT/US2017/041722, dated Aug. 24, 2017.
International Search report from corresponding PCT application No. PCT/US2017/041722, dated Sep. 14, 2017.

\* cited by examiner

APPARATUS FOR CATALYTIC REFORMING HYDROCARBONS HAVING FLOW DISTRIBUTOR AND PROCESS FOR REFORMING HYDROCARBONS

FIELD OF THE INVENTION

The present invention relates generally to an apparatus and a process for catalytic reforming of hydrocarbons and more particularly to an apparatus and a process for increasing the yield from such an apparatus.

BACKGROUND OF THE INVENTION

The reforming of petroleum raw materials is an important process for producing useful products. For example, reforming processes may be utilized for separating and upgrading hydrocarbons to provide a transportation fuel, such as producing a naphtha feed stream and upgrading the octane value of the naphtha from the production of gasoline. Additionally, hydrocarbons in feed streams from a raw petroleum source may also be utilized the production of desired chemical precursors for use in the production of plastics, detergents and other products. Accordingly, reforming may be used to produce the desired chemical precursors.

The catalytic reforming process is well known in the art. The principal reactions that take place are the dehydrogenation of naphthenes to aromatics, dehydrocyclization of paraffins, isomerization of paraffins and naphthenes, hydrocracking of paraffins to light hydrocarbons, and formation of coke which is deposited on the catalyst. The formation of coke on the catalyst causes the catalyst to gradually lose activity over time. Accordingly, the catalyst requires regeneration and/or replacement. A continuous transfer of catalyst from and to the reactor is highly desirable.

Typically, in such a reactor, a hydrocarbon feedstock and a hydrogen-rich gas are preheated and charged to a reforming zone containing typically two to five reactors in series. The effluent from the first reactor is withdrawn, heated, and passed to the second reactor. The effluent from the second reactor is withdrawn, reheated and passed to the third reactor. The withdrawal and reheating of the effluent continues until the last reactor and is typically referred to as a radial flow. From the last reactor, the effluent is withdrawn and processed further.

The feedstock/partially converted effluent streams are often passed into the reactor stack via non-reactive sections. Catalyst flows downward through the non-reactive sections in conduits so as to avoid contacting the feedstock/partially converted effluent streams in the non-reactive zones. This empty space is required for meeting the hydraulics requirements in some reactors. In other reactors, the space is required for the reactor inspection, maintenance, and repair. The empty space contains mechanical parts like catalyst transfer pipes, mechanical supports, and process lines. For incoming flow, this will cause flow impingement that results in unequal process gas distribution to the circumference of the reactor. This ultimately results in lower yields and lower utilization of the reactive zone.

Thus, there is an ongoing desirability desire to provide solutions which effectively and efficiently distribute the process gas within the non-reactive zone while maintaining appropriate flow pressure drop of the fluids flowing therein.

SUMMARY OF THE INVENTION

Reactors for reforming hydrocarbons, and process using same, have been invented. In contrast to conventional reactors, in various embodiments of the present invention, the outlet nozzle is located above the inlet nozzle. More specifically, conventional reactor design typically locates the inlet nozzle above (i.e., at a higher vertical position than) the outlet nozzle. This creates a large non-reactive volume region in the cone section within the reactor. In various aspects of the present invention, however, the inlet nozzle is moved closer to the catalyst bed, decreasing the elevation of the inlet nozzle, and allowing the invention to further reduce hot volume not only in the cone region but also in the inlet transfer piping. Concomitantly, the outlet nozzle is moved above the inlet nozzle and above a horizontal separation flow distributor sealing off the extra hot volume space in the non-reactive zone. This configuration thus positions the miter outlet elbow outside of the section of the non-reactive zone where inlet vapor enters the reactor, allowing inlet vapor to expand symmetrically and evenly distribute into the scallop risers, potentially eliminating the need for an additional distribution device. Such a configuration adds little to no pressure drop while still achieving proper distribution of the gas to the catalyst bed. Since this design does not add pressure drop, the pressure drop savings may be used to reduce non-reactive volume elsewhere.

The disclosed reactors and processes maintain the required space necessary for hydraulics or maintenance but minimize or lower the amount of the space that is accessible to the feedstock/partially converted effluent streams. The present configuration surprisingly reduces the amount of turbulence of process gas in the non-reactive section of the reactor while providing sufficient distribution for the process gas within the non-reactive section.

Therefore, the present invention may be characterized, in at least one aspect, as providing a radial flow reactor comprising: a non-reactive zone; a reaction zone disposed below the non-reactive zone and separated from the non-reactive zone by a plate; an inlet for a hydrocarbon feed stream in the non-reactive zone; and, an outlet for an effluent stream in the non-reactive zone, the outlet in fluid communication with the reaction zone. The inlet is disposed between the outlet and the reaction zone. The non-reactive zone may be separated into a first portion and a second portion by a flow distributor. The inlet may be located in the second portion of the non-reactive zone. The outlet may be located in the first portion of the non-reactive zone. The flow distributor may be a horizontal flow distributor. The flow distributor may be an angled flow distributor. The flow distributor may comprise a plurality of sections, each having, when viewed from a top, a shape of a sector of an annulus. The radial flow reactor may comprise an inlet for a purge gas stream, the inlet for purge gas stream may be disposed in the first portion of the non-reactive zone. The flow distributor may comprise an aperture for allowing purge gas to flow from the first portion of the non-reactive zone to the second portion of the non-reactive zone. The outlet may be in fluid communication with the reaction zone via a centerpipe, and the centerpipe may have a changing diameter within the non-reactive zone. The changing diameter of the centerpipe may comprise both an increasing diameter and a decreasing diameter.

In a second aspect, the present invention may be generally characterized as providing a radial flow reactor comprising: a non-reactive zone separated into an upper portion and a lower portion by a flow distributor; a reaction zone disposed below the non-reactive zone, the reaction zone being a radial flow reaction zone; an inlet for a hydrocarbon feed stream in the lower portion of the non-reactive zone; and, an outlet for an effluent stream in the upper portion of the non-reactive zone, the outlet in fluid communication with the reaction zone with a centerpipe. The flow distributor may be a horizontal flow distributor. The flow distributor may be an angled flow distributor. The flow distributor may comprise a plurality of sections, each having, when viewed from a top, a shape of a sector of an annulus. A width of the inlet may be substantially equal to a height of the lower portion of the non-reactive zone. The upper portion of the non-reactive zone may include an inlet for a purge gas. The flow distributor may comprise an aperture for allowing purge gas to flow from the upper portion of the non-reactive zone to the lower portion of the non-reactive zone.

In a third aspect, the present inventing may be characterized, broadly, as providing a process for reforming hydrocarbons in a reactor by: injecting, via an inlet, a hydrocarbon stream into a non-reactive zone of the reactor, wherein the non-reactive zone of the reactor is separated into an upper portion and a lower portion by a flow distributor; passing hydrocarbons from the hydrocarbon stream from the lower portion of the non-reactive zone to a reaction zone of the reactor; passing catalyst particles to the reaction zone, wherein the catalyst particles are retained in a catalyst section within the reaction zone; passing the hydrocarbons through the catalyst section in a radial direction; passing an effluent from the reaction zone through the lower portion of the non-reaction zone of the reactor to the upper portion of the non-reactive zone; and, recovering, via an outlet, an effluent stream from the non-reactive zone of the reactor, wherein the outlet is located above the inlet. The process may further include: injecting a purge gas stream into the upper portion of the non-reactive zone of the reactor; and, passing purge gas from the purge gas stream from the upper portion of the non-reactive zone to the lower portion of the non-reactive zone.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, reactors and processes from reforming hydrocarbons have been invented in which, unlike conventional reactors, the outlet nozzle is located above the inlet nozzle. Additionally, a flow distributor may be provided to separate the non-reactive zone into two sections.

According to the present aspects, Flow distribution from the non-reactive zone to the reactive zone can be improved 2-4%. With these general principles in mind, one or more embodiments of the present invention will be described with the understanding that the following description is not intended to be limiting.

Figure 1:
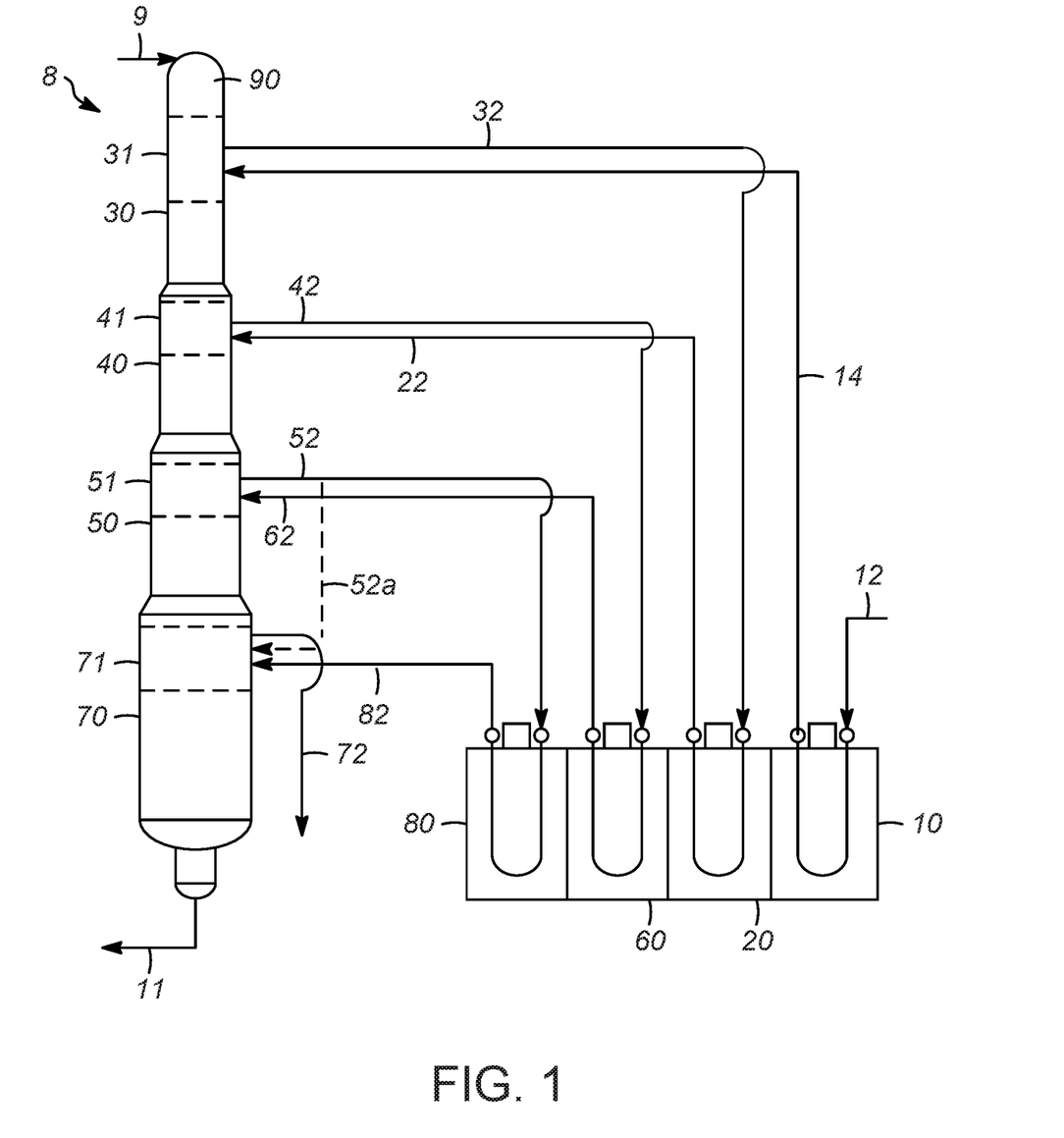
FIG. 1 shows a reactor unit according to one or more aspects of the present invention.

With reference to FIG. 1, the present invention is directed to a reforming reactor 8 for a hydrocarbon feed stream 12. The hydrocarbon feed stream 12 typically comprises naphthenes and paraffins boiling within the gasoline range. The preferred feed streams 12 includes straight-run naphthas, thermally or catalytically cracked naphthas, partially reformed naphthas, raffinates from aromatics extraction and the like. Usually such feed streams 12 have been hydrotreated to remove contaminants, especially sulfur and nitrogen. A gasoline-range feed streams 12 may be a full-range naphtha having an initial boiling point from about 40° to about 70° C. and an end boiling point within the range from about 160° to about 220° C., or may be a selected fraction thereof. The feed stream 12 may be heated in a charge heater 10 and passed to the reforming reactor 8 along with a catalyst in a catalyst transfer line 9.

Operating conditions used for reforming processes usually include an absolute pressure selected within the range from about 100 to about 7,000 kPa (about 14.5 to about 1015 psi), or from about 350 to about 4,250 kPa (about 51 to about 616 psi). It is believed that particularly good results may be obtained at low pressure, namely an absolute pressure from about 350 to about 2,500 kPa (about 51 to about 363 psi). Reforming conditions include a temperature in the range from about 315° to about 600° C. (about 599° to about 1112° F.), or from about 425° to about 565° C. (about 797° to about 1049° F.). As is well known to those skilled in the reforming art, the initial selection of the temperature within this broad range is made primarily as a function of the desired octane of the product reformate, considering the characteristics of the feed stream and of the catalyst.

The reforming conditions in the present invention also typically include sufficient hydrogen to provide an amount from about 1 to about 20 moles of hydrogen per mole of hydrocarbon feed entering the reforming zone, with enhanced results being obtained when about 2 to about 10 moles of hydrogen are used per mole of hydrocarbon feed likewise, the liquid hourly space velocity (LHSV) used in reforming is selected from the range from about 0.1 to about 10 $hr^{-1}$, or from about 1 to about 5 $hr^{-1}$.

A multi-functional catalyst composite, which contains a metallic hydrogenation-dehydrogenation component on a porous inorganic oxide support providing acid sites for cracking and isomerization, is usually employed in catalytic reforming. Most reforming catalyst is in the form of spheres or cylinders having an average particle diameter or average cross-sectional diameter from about 1.59 to about 4.76 mm (1/16 inch to about 3/16 inch). Catalyst composites comprising platinum on highly purified alumina or on zeolitic supports are particularly well known in the art. Metallic modifiers that improve product yields or catalyst life, such as rhenium, iridium, tin, and germanium, also may be incorporated into the catalyst.

As shown in FIG. 1, the reforming reactor 8 contains a series of four reaction zones 30, 40, 50, 70 arranged vertically in reforming reactor 8. This is merely one configuration and is not intended to be limiting, other configurations may be utilized for practicing the present invention. Catalyst particles enter the top of the reforming reactor 8 through the catalyst transfer line 9 and pass through the series reaction zones 30, 40, 50, 70 under gravity flow. After passing through all of the reaction zones 30, 40, 50, 70, the catalyst particles are withdrawn from the bottom of the reforming reactor 8 by one or more catalyst withdrawal lines 11. Catalyst withdrawn through the catalyst withdrawal lines 11 may be regenerated by the oxidation and removal of coke deposits in a regeneration zone (not shown). After regeneration, catalyst particles may be again returned to the process and the reforming reactor 8 by the catalyst transfer line 9.

After the feed stream 12 is heated in charge heater 10, the heated feed 14 can pass to the first reaction zone 30. Since the reforming reaction is endothermic, heaters are used to add heat to drive the catalyst reaction forward towards the desired product. Therefore, a first reactor effluent 32 is passed to a first heater 20 to generate a heated second reactor feed 22. A second reactor effluent 42 is passed to another heater 60 to generate a heated third reactor feed 62. A third reactor effluent 52 is passed to another heater 80 to generate a fourth reactor feed 82. A fourth reactor effluent 72 comprises a reformate product which can be recovered from the reactor 8 and processed further as is known. In the fixed bed and continuous catalyst regeneration reforming processes, the heaters are commonly used to heat up the feed streams 14, 22, 62, 82 to an elevated temperature and catalyzed by metal based catalyst in the catalyst reactive zone in order to meet the product quality specifications such as product octane, aromatics product yield, and hydrogen product yield.

As shown in the FIG. 1, the introduction of heated feed streams 14, 22, 62, 82 and withdrawal of effluent streams 32, 42, 52, 72 occurs in non-reactive zones 31, 41, 51, 71. As can be seen, some of the non-reactive zones 31, 41, 51, 71 are spaced between consecutive reaction zone 30, 40, 50, 70, while the first non-reactive zone 31 is disposed between the first reaction zone 30 and a catalyst introduction zone 90. The catalyst introduction zone 90 may comprise a reduction zone. In a reduction zone, the oxidized catalyst from the catalyst regeneration section (not shown) is reduced to a reduced state for optimal performance. Alternatively, the catalyst introduction zone 90 may comprise a catalyst surge zone which provides catalyst surging capability.

The non-reactive zones 31, 41, 51, 71 typically function as a distribution zone in which catalyst is substantially absent. In these non-reactive zones 31, 41, 51, 71 there are significant piping and fittings that cause flow imbalance, turbulence, and impingement. Additionally, the top section of the non-reactive zone typically has a large eddy current where process gas is accumulating turbulence. This unwanted turbulence causes mal-distribution to the reactive zone, higher pressure drop, and, as a result, reaction yield is compromised.

The size or volume of the non-reactive zones 31, 41, 51, 71 is typically governed by personnel access requirement for performing maintenance activities and installation of the reactor internals. Additionally, the size of the non-reactive zones 31, 41, 51, 71 is also governed by system hydraulics requirement for proper catalyst flow transportation between an upper catalyst containing vessel such as catalyst introduction zone 90, or a reaction zone 30, 40, 50, and another reaction zone 30, 40, 50, 70. These requirements generally govern the dimensional size for the non-reactive zones 31, 41, 51, 71 and the size is often greater than the required size or volume for proper feed distribution to achieve even flow. With the internal equipment in this section, there is a lot of flow impingement that causes flow imbalance. Typically, the volume of the non-reactive zones 31, 41, 51, 71 determines the residence time of the heated feed streams 14, 22, 62, 82 in the non-reactive zones 31, 41, 51, 71.

The present invention is directed at efficiently and effectively evenly distributing the process gas to the reaction zones 30, 40, 50, 70 through the non-reactive zones 31, 41, 51, 71 that the feed (or intermediate effluent) occupies, and decreasing the flow imbalance to the reaction zones 30, 40, 50, 70. By reducing the non-reactive volume that the process gas is in contact with, turbulence is reduced and circumferential flow distribution is improved.

Figure 2:
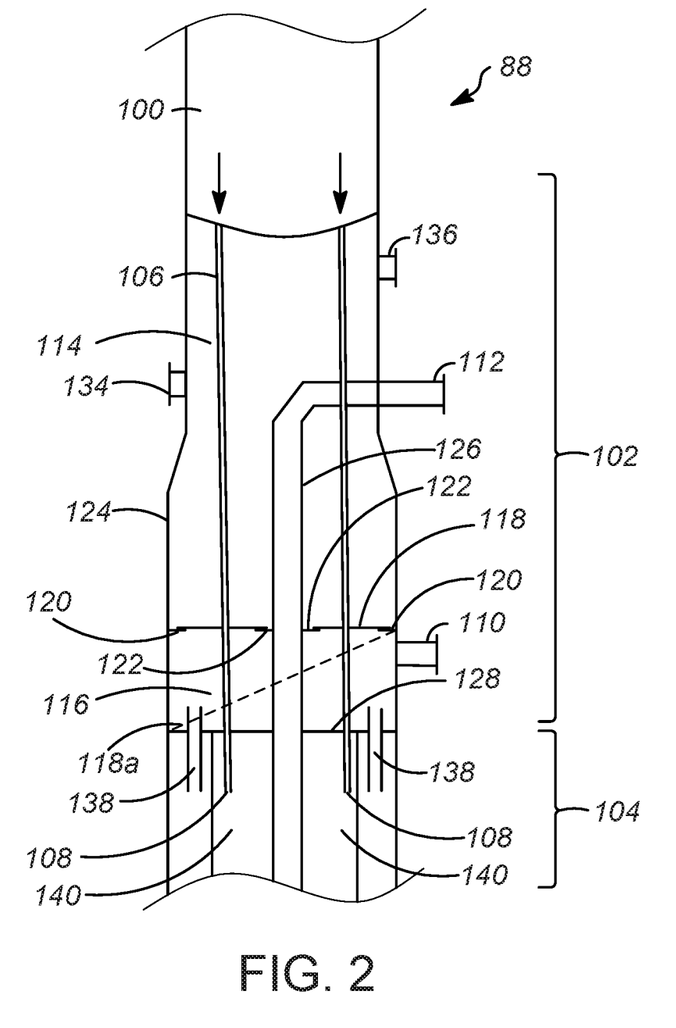
FIG. 2 shows a side cutaway view of a portion of a reactor unit according to one or more aspects of the present invention.
Figure 3:
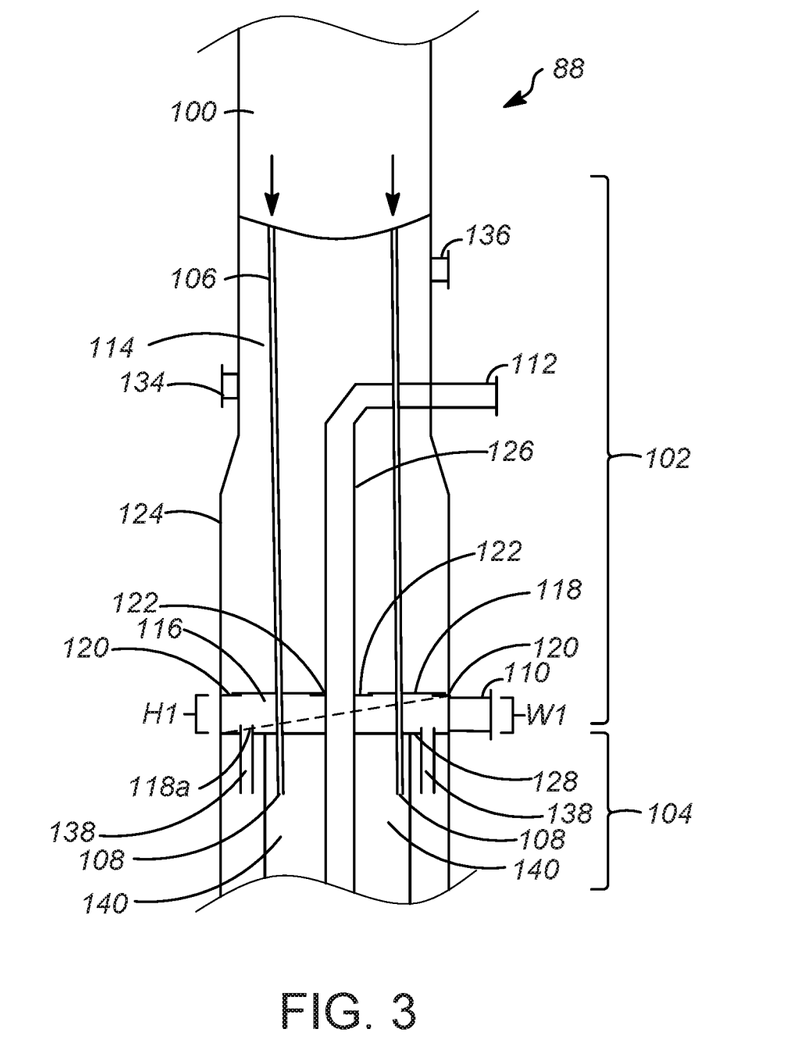
FIG. 3 shows a side cutaway view of a portion of another reactor unit according to one or more aspects of the present invention.
Figure 4:
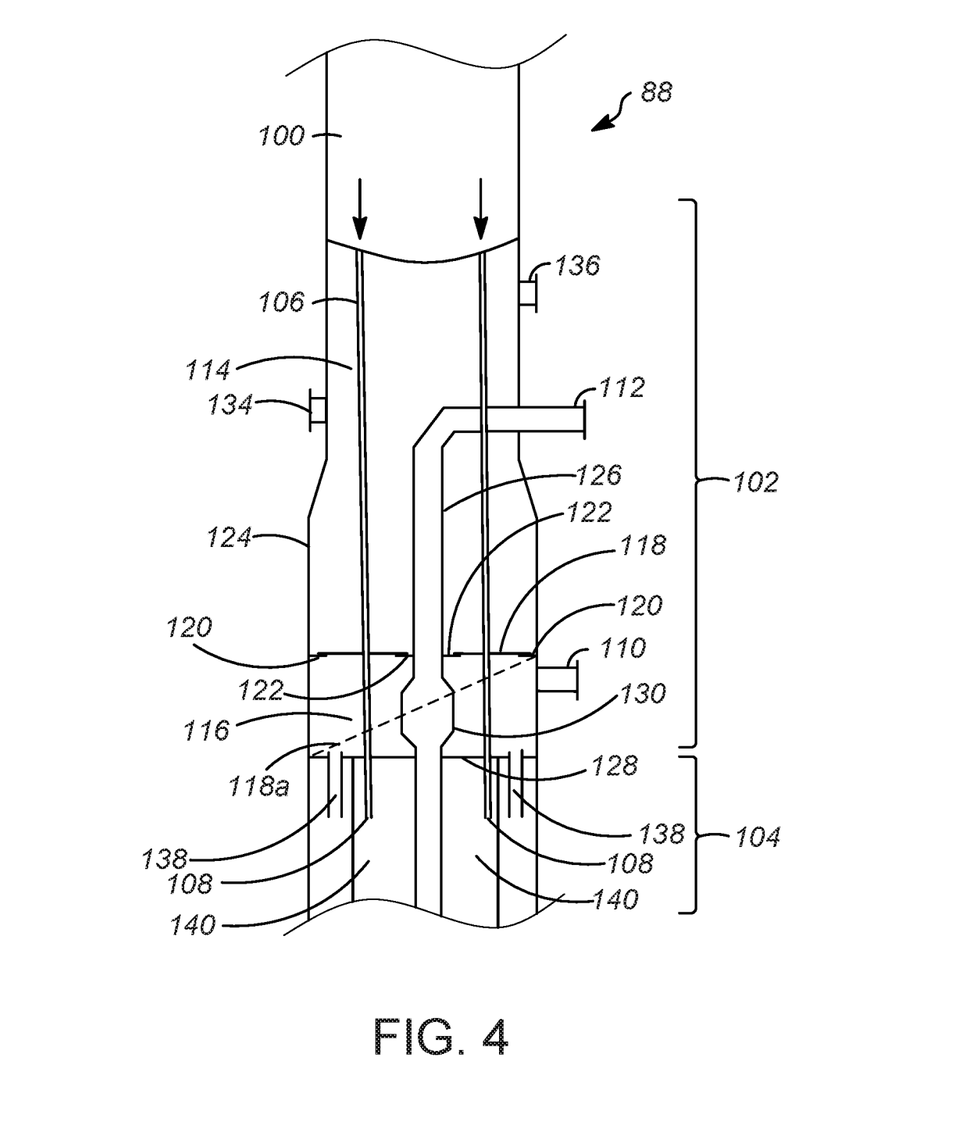
FIG. 4 shows a side cutaway view of a portion of another reactor unit according to one or more aspects of the present invention; and, FIG. 5 shows a top view of a flow distributor used in a reactor unit according to one or more aspects of the present invention.

Turning to FIGS. 2 to 4, a portion of a reactor unit 88 is shown which includes a catalyst source zone 100, a non-reactive zone 102, and a reaction zone 104. The catalyst source zone 100 may comprise the catalyst introduction zone 90 (from FIG. 1) or a reaction zone 30, 40, 50 (from FIG. 1) depending on the number of reaction zones 104 and the type of reactor unit 88. Conduits, or catalyst transfer pipes, 106 transfer catalyst from the catalyst source zone 100 through the non-reactive zone 102 so that the catalyst is isolated from any reactants within the non-reactive zone 102. Outlets 108 for the conduits 106 are disposed within the reaction zone 104.

As mentioned above, in order to evenly distribute the vapor (from streams 14, 22, 62, 82 in FIG. 1) into the reaction zone 104, a feed inlet nozzle 110 to the non-reactive zone 102 is located closer to the reaction zone 104 than in the conventional designs. Accordingly, an outlet nozzle 112 (for streams 32, 42, 52, 72 from FIG. 1) is located farther from the reaction zone 104 than the conventional designs. Thus, in the present embodiments, the feed inlet nozzle 110 is located between the outlet nozzle 112 and the reaction zone 104.

Additionally, the non-reactive zone 102 is separated into two portions, a first or upper portion 114 and a second or lower portion 116, by a flow distributor 118, which may be a vane, plate, baffle, or other such flow directing structures. The flow distributor 118 may be supported by rings 120, 122. More specifically, the flow distributor 118 is supported by an outer support ring 120 welded to an inner surface of the reactor shell 124 and an inner support ring 122 attached to the center pipe 126 (or other reactor outlet piping) inside the reactor 88. The connections at the inner and outer support ring 120, 122 should be able to withstand radial and axial thermal movement between the reactor shell 124 and the centerpipe 126 (or other reactor outlet piping). As noted above, by moving the feed inlet nozzle 110 lower, the size of the second portion 116 of the non-reactive zone 102 (the portion that receives the feed from the feed inlet nozzle 110) may be made smaller.

FIGS. 3 and 4 depict further embodiments in which the process gas is further streamlined through the second portion 116 of the non-reactive zone 102.

In FIG. 3, the feed inlet nozzle 110 is positioned so that it is inline, at its uppermost position, with the flow distributor 118 and, aligned, at its lowermost potions, with a plate 128 separating the reactive zone 104 and the non-reactive zone 102. In such a configuration, a width W1 of the feed inlet nozzle 110 is substantially equal (at least 90%) to a height H1 of the second portion 116 of the non-reactive zone 102.

In FIG. 4, the centerpipe 126 has a swaged portion 130 with a diameter that increases and decreases within the second portion 116 of the non-reactive zone 102. Since the centerpipe 126 with the swaged portion 130 occupies more space compared to a centerpipe 126 with a constant diameter, the volume that the vapor may occupy in the second portion 116 of the non-reactive zone 102 is reduced.

Figure 5:
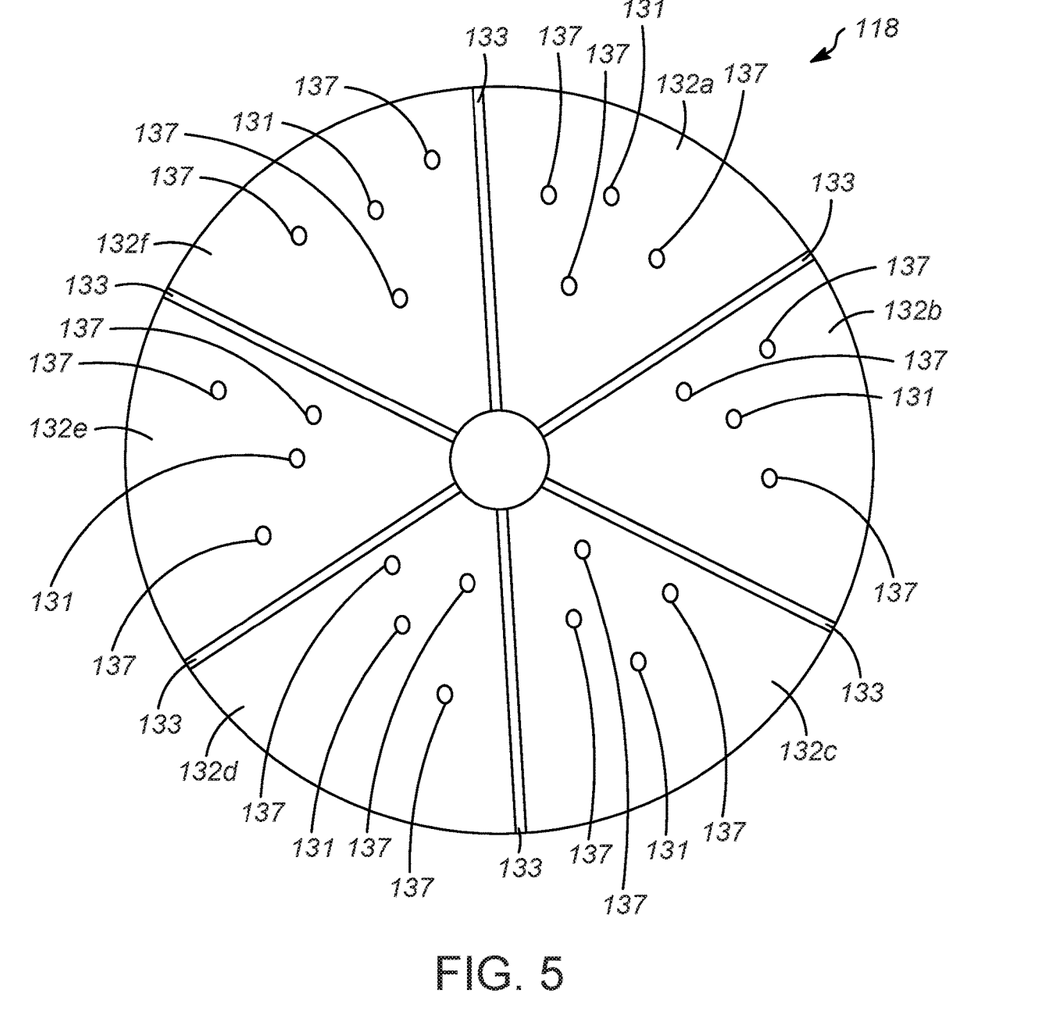

Turning to FIG. 5, the flow distributor 118 assembly is separated into sections 132a, 132b, 132c, 132d, 132e, 132f that are sized and configured to be installed and removed either through the top of the reactor 88 or via the side manway 134 (FIGS. 2 to 4), which can be positioned for optimal access to internals. Typical manways 132 are approximately 0.61 meters (24 inches) in diameter, however, the size of the manway 132 may range between 0.46 to 1.22 meters (18 to 48 inches). As shown, each section 132a, 132b, 132c, 132d, 132e, 132f of the flow distributor 118, when viewed from a top, has a shape of a sector of an annulus. Installing/removing the sections 132a, 132b, 132c, 132d, 132e, 132f of the flow distributor 118 from the side manway 134 simplifies the installation process since other reactor internals do not need to be disturbed, making it easy to manage during a turnaround. Additionally, the sections 132a, 132b, 132c, 132d, 132e, 132f function as a manway themselves such that a person could remove one of the sections 132a, 132b, 132c, 132d, 132e, 132f to pass from the upper portion 114 of the non-reactive zone 102 to the lower portion 116 of the non-reactive zone 102 without removing the entirety of the flow distributor 118. These removable sections 132a, 132b, 132c, 132d, 132e, 132f can be either welded, bolted, or attached via hinge pins.

There are holes 131 in the sections 132a, 132b, 132c, 132d, 132e, 132f to allow the catalyst transfer pipes 106 to pass through the flow distributor 118. Joints 133 between the sections 132a, 132b, 132c, 132d, 132e, 132f reinforce the mechanical integrity of the flow distributor 118, as well as to seal off the second portion 116 of the non-reactive zone 102 from the first portion 114. The joint 133 connections may utilize either wedge pin, bolted, or welded connections. The flow distributor 118 allows space for personnel access during turnaround activities and may be utilized to support personnel entry for inspection, maintenance and installation activities during turnarounds.

Returning to FIGS. 2 to 4, purge gas may be introduced via a purge gas inlet 136 into the first portion 114 of the non-reactive zone 102. The purge gas is <1% of the total inlet process flow to the reactor 88 and is utilized to sweep the first portion 114 of the non-reactive zone 102 and minimize coking. The purge gas exits the first portion 114 of the non-reactive zone 102 and mixes with the rest of the inlet gas flow either via small vent hole(s) 137 in the flow distributor 118 (FIG. 5) in, and specifically in the sections 132a, 132b, 132c, 132d, 132e, 132f, enlarged holes 131 (FIG. 5) in the sections 132a, 132b, 132c, 132d, 132e, 132f where catalyst transfer pipes 106 will pass through, and/or specified gaps designed into the joints 133 (FIG. 5) between the sections 132a, 132b, 132c, 132d, 132e, 132f. It may be desirable to utilize a small mechanical fitting (such as a fender washer) around the transfer pipes 106 to reduce the amount of purge gas needed while also providing mechanical flexibility during thermal expansion of the reactor unit 88.

The purge gas comprises molecular weight stable gas at the operating temperature of the reactor unit 88 and can be, for example, inert gas such halide, nitrogen, or hydrogen rich gas containing more than 70% by volume of hydrogen, light hydrocarbon species ($C_5-$ hydrocarbons) and less than 5% by volume of $C_6$ hydrocarbons, preferably containing 80% or more by volume of hydrogen and less than 1% by volume of $C_6$ hydrocarbons. As shown in FIG. 1, it is contemplated that the purge gas for the non-reactive zone may comprise a portion of the effluent 32, 42, 52, 72 from a reaction zone 30, 40, 50, 70, preferably an upstream reaction zone. For example, with reference to FIG. 1, a portion of the effluent 52 form the third reaction zone 50 in line 52a may be used as the purge gas in the non-reactive zone 71 associated with the fourth reaction zone 70. Use of a portion of the effluent 32, 42, 52, 72 will minimize the need or use of an external purge gas, which may be especially beneficial in applications in which the invention is practiced by revamping an existing reformer.

To prevent the feed from diffusing to and occupying the first portion 114 of the non-reactive zone 102, the second portion 116 of the non-reactive zone 102 is preferably kept at a higher pressure than the second portion 116 of the non-reactive zone 102 by a differential pressure controller and control valve (not shown). The differential pressure control valve injects sufficient amounts of purge gas rate on a continuous basis to maintain a positive differential pressure between the first portion 114 and the second portion 116 that is preferably between 1.24 kPag to 68.9 kPag (about 0.18 to about 10 psi).

The combined gas (feed and purge) may pass to the reaction zone 104 through conduits 138, such as scallops. See, e.g., U.S. Pat. Nos. 5,366,704, 6,224,838, and 7,842,257. The conduits 138 typically include a perforate plate or screen and distribute the feed passing to the reaction zone 104. Preferably, there is a positive pressure differential between the second portion 116 of the non-reactive zone 102 and the conduits 138 that is between about 0.2 to about 24 kPag (about 0.03 to about 3.5 psi). This pressure differential will allow the second portion 116 of the non-reactive zone 102 to function as a distribution chamber for the feed entering through the feed inlet nozzle 110.

Thus, in operation, the reactor section 88 may be used in a process for reforming hydrocarbons. In an exemplary process, a hydrocarbon stream (either feed or partially reformed effluent) is injected into the non-reactive zone 102 via the feed inlet nozzle 110. The non-reactive zone 102 is separated into the upper portion 114 and the lower portion 116 by the flow distributor 118. The hydrocarbons from the feed are passed from the lower portion 116 of the non-reactive zone 102 to the reaction zone 104 of the reactor portion 88. Catalyst particles (see arrows in the catalyst source zone 100) are passed into the reaction zone 104 via the catalyst transfer pipes 106. The catalyst particles discharged from the outlets 108 for the conduits 106 are retained in a catalyst section 140 within the reaction zone 104. The hydrocarbons pass into and through the catalyst section 140 in a radial direction. In the depicted embodiment, this is inwardly, but it also contemplated that the flow be reversed. An effluent from the reaction zone is passed, within the centerpipe 126, through the lower portion 116 of the non-reactive zone 102 and through the upper portion 114 of the non-reactive zone 102. An effluent stream, such as stream 32, 42, 52, 72 (FIG. 1), may be recovered, via the outlet nozzle 112, from the non-reactive zone 102 of the reactor section 88.

As mentioned above, the process may also include injecting a purge gas through the purge gas inlet 136 into the upper portion 114 of the non-reactive zone 102 of the reactor section 88. The purge gas may pass from the upper portion 114 of the non-reactive zone 102 through vent holes 137, joints 133, or other passageways through the flow distributor 118 to the lower portion 116 of the non-reactive zone 102. The purge gas will combine with the hydrocarbons in the lower portion 116 of the non-reactive zone 102 and be processed further as discussed above.

Thus, the present invention provides an efficient and effective configuration for effectively and efficiently distributing the process gas through the non-reactive zone 102 of a reforming reactor.

It should be appreciated and understood by those of ordinary skill in the art that various other components such as valves, pumps, compressors, instrumentation, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a radial flow reactor comprising a non-reactive zone; a reaction zone disposed below the non-reactive zone and separated from the non-reactive zone by a plate; an inlet for a hydrocarbon feed stream in the non-reactive zone; and, an outlet for an effluent stream in the non-reactive zone, the outlet in fluid communication with the reaction zone, and wherein the inlet is disposed between the outlet and the reaction zone. An embodiment of the invention is one, any or all of prior embodiments in this paragraph up through the first embodiment in this paragraph, wherein the non-reactive zone is separated into a first portion and a second portion by a flow distributor. An embodiment of the invention is one, any or all of prior embodiments in this paragraph up through the first embodiment in this paragraph, wherein the inlet is located in the second portion of the non-reactive zone. An embodiment of the invention is one, any or all of prior embodiments in this paragraph up through the first embodiment in this paragraph, wherein the outlet is located in the first portion of the non-reactive zone. An embodiment of the invention is one, any or all of prior embodiments in this paragraph up through the first embodiment in this paragraph, wherein the flow distributor is a horizontal flow distributor. An embodiment of the invention is one, any or all of prior embodiments in this paragraph up through the first embodiment in this paragraph, wherein the flow distributor is an angled flow distributor. An embodiment of the invention is one, any or all of prior embodiments in this paragraph up through the first embodiment in this paragraph, wherein the flow distributor comprises a plurality of sections, each having, when viewed from a top, a shape of a sector of an annulus. An embodiment of the invention is one, any or all of prior embodiments in this paragraph up through the first embodiment in this paragraph, further comprising an inlet for a purge gas stream, the inlet for purge gas stream disposed in the first portion of the non-reactive zone. An embodiment of the invention is one, any or all of prior embodiments in this paragraph up through the first embodiment in this paragraph, wherein the flow distributor comprises an aperture for allowing purge gas to flow from the first portion of the non-reactive zone to the second portion of the non-reactive zone. An embodiment of the invention is one, any or all of prior embodiments in this paragraph up through the first embodiment in this paragraph, wherein the outlet is in fluid communication with the reaction zone via a centerpipe, and wherein the centerpipe has a changing diameter within the non-reactive zone. An embodiment of the invention is one, any or all of prior embodiments in this paragraph up through the first embodiment in this paragraph, wherein the changing diameter of the centerpipe comprises both an increasing diameter and a decreasing diameter.

A second embodiment of the invention is a radial flow reactor comprising a non-reactive zone separated into an upper portion and a lower portion by a flow distributor; a reaction zone disposed below the non-reactive zone, the reaction zone being a radial flow reaction zone; an inlet for a hydrocarbon feed stream in the lower portion of the non-reactive zone; and, an outlet for an effluent stream in the upper portion of the non-reactive zone, the outlet in fluid communication with the reaction zone with a centerpipe. An embodiment of the invention is one, any or all of prior embodiments in this paragraph up through the second embodiment in this paragraph, wherein the flow distributor is a horizontal flow distributor. An embodiment of the invention is one, any or all of prior embodiments in this paragraph up through the second embodiment in this paragraph, wherein the flow distributor is an angled flow distributor. An embodiment of the invention is one, any or all of prior embodiments in this paragraph up through the second embodiment in this paragraph, wherein the flow distributor comprises a plurality of sections, each having, when viewed from a top, a shape of a sector of an annulus. An embodiment of the invention is one, any or all of prior embodiments in this paragraph up through the second embodiment in this paragraph, wherein a width of the inlet is substantially equal to a height of the lower portion of the non-reactive zone. An embodiment of the invention is one, any or all of prior embodiments in this paragraph up through the second embodiment in this paragraph, wherein the upper portion of the non-reactive zone includes an inlet for a purge gas. An embodiment of the invention is one, any or all of prior embodiments in this paragraph up through the second embodiment in this paragraph, wherein the flow distributor comprises an aperture for allowing purge gas to flow from the upper portion of the non-reactive zone to the lower portion of the non-reactive zone.

A third embodiment of the invention is a process for reforming hydrocarbons in a reactor, the process comprising injecting, via an inlet, a hydrocarbon stream into a non-reactive zone of the reactor, wherein the non-reactive zone of the reactor is separated into an upper portion and a lower portion by a flow distributor; passing hydrocarbons from the hydrocarbon stream from the lower portion of the non-reactive zone to a reaction zone of the reactor; passing catalyst particles to the reaction zone, wherein the catalyst particles are retained in a catalyst section within the reaction zone; passing the hydrocarbons through the catalyst section in a radial direction; passing an effluent from the reaction zone through the lower portion of the non-reaction zone of the reactor to the upper portion of the non-reactive zone; and, recovering, via an outlet, an effluent stream from the non-reactive zone of the reactor, wherein the outlet is located above the inlet. An embodiment of the invention is one, any or all of prior embodiments in this paragraph up through the third embodiment in this paragraph, further comprising injecting a purge gas stream into the upper portion of the non-reactive zone of the reactor; and, passing purge gas from the purge gas stream from the upper portion of the non-reactive zone to the lower portion of the non-reactive zone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A radial flow reactor comprising:
a non-reactive zone;
a reaction zone disposed below the non-reactive zone and separated from the non-reactive zone by a plate;
an inlet for a hydrocarbon feed stream in the non-reactive zone; and,
an outlet for an effluent stream in the non-reactive zone, the outlet in fluid communication with the reaction zone, and
wherein the inlet is disposed between the outlet and the reaction zone.

2. The radial flow reactor of claim 1, wherein the non-reactive zone is separated into a first portion and a second portion by a flow distributor.

3. The radial flow reactor of claim 2, wherein the inlet is located in the second portion of the non-reactive zone.

4. The radial flow reactor of claim 3, wherein the outlet is located in the first portion of the non-reactive zone.

5. The radial flow reactor of claim 2, wherein the flow distributor is a horizontal flow distributor.

6. The radial flow reactor of claim 2, wherein the flow distributor is an angled flow distributor.

7. The radial flow reactor of claim 2, wherein the flow distributor comprises a plurality of sections, each having, when viewed from a top, a shape of a sector of an annulus.

8. The radial flow reactor of claim 2, further comprising: an inlet for a purge gas stream, the inlet for purge gas stream disposed in the first portion of the non-reactive zone.

9. The radial flow reactor of claim 8, wherein the flow distributor comprises an aperture for allowing purge gas to flow from the first portion of the non-reactive zone to the second portion of the non-reactive zone.

10. The radial flow reactor of claim 1, wherein the outlet is in fluid communication with the reaction zone via a centerpipe, and
wherein the centerpipe has a changing diameter within the non-reactive zone.

11. The radial flow reactor of claim 10, wherein the changing diameter of the centerpipe comprises both an increasing diameter and a decreasing diameter.

12. A radial flow reactor comprising:
a non-reactive zone separated into an upper portion and a lower portion by a flow distributor;
a reaction zone disposed below the non-reactive zone, the reaction zone being a radial flow reaction zone;
an inlet for a hydrocarbon feed stream in the lower portion of the non-reactive zone; and,
an outlet for an effluent stream in the upper portion of the non-reactive zone, the outlet in fluid communication with the reaction zone with a centerpipe.

13. The radial flow reactor of claim 12, wherein the flow distributor is a horizontal flow distributor.

14. The radial flow reactor of claim 12, wherein the flow distributor is an angled flow distributor.

15. The radial flow reactor of claim 12, wherein the flow distributor comprises a plurality of sections, each having, when viewed from a top, a shape of a sector of an annulus.

16. The radial flow reactor of claim 12, wherein a width of the inlet is substantially equal to a height of the lower portion of the non-reactive zone.

17. The radial flow reactor of claim 12, wherein the upper portion of the non-reactive zone includes an inlet for a purge gas.

18. The radial flow reactor of claim 17, wherein the flow distributor comprises an aperture for allowing purge gas to flow from the upper portion of the non-reactive zone to the lower portion of the non-reactive zone.

19. A process for reforming hydrocarbons in a reactor, the process comprising:
injecting, via an inlet, a hydrocarbon stream into a non-reactive zone of the reactor, wherein the non-reactive zone of the reactor is separated into an upper portion and a lower portion by a flow distributor;
passing hydrocarbons from the hydrocarbon stream from the lower portion of the non-reactive zone to a reaction zone of the reactor;

passing catalyst particles to the reaction zone, wherein the catalyst particles are retained in a catalyst section within the reaction zone;

passing the hydrocarbons through the catalyst section in a radial direction;

passing an effluent from the reaction zone through the lower portion of the non-reaction zone of the reactor to the upper portion of the non-reactive zone; and, recovering, via an outlet, an effluent stream from the non-reactive zone of the reactor, wherein the outlet is located above the inlet.

20. The process of claim 19, further comprising:

injecting a purge gas stream into the upper portion of the non-reactive zone of the reactor; and, passing purge gas from the purge gas stream from the upper portion of the non-reactive zone to the lower portion of the non-reactive zone.

* * * * *